United States Patent
Yoshii et al.

(10) Patent No.: US 12,368,005 B2
(45) Date of Patent: *Jul. 22, 2025

(54) SOLID ELECTROLYTIC CAPACITOR ELEMENT AND SOLID ELECTROLYTIC CAPACITOR

(71) Applicant: Panasonic Intellectual Property Management Co., Ltd., Osaka (JP)

(72) Inventors: Takahiro Yoshii, Osaka (JP); Kei Hirota, Okayama (JP); Hiromi Ozawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 262 days.

This patent is subject to a terminal disclaimer.

(21) Appl. No.: 18/245,301

(22) PCT Filed: Oct. 21, 2021

(86) PCT No.: PCT/JP2021/038852
§ 371 (c)(1),
(2) Date: Mar. 14, 2023

(87) PCT Pub. No.: WO2022/085747
PCT Pub. Date: Apr. 28, 2022

(65) Prior Publication Data
US 2023/0360859 A1    Nov. 9, 2023

(30) Foreign Application Priority Data

Oct. 23, 2020 (JP) ................. 2020-177935

(51) Int. Cl.
*H01G 9/028* (2006.01)
*H01G 9/15* (2006.01)

(52) U.S. Cl.
CPC .............. *H01G 9/028* (2013.01); *H01G 9/15* (2013.01)

(58) Field of Classification Search
CPC ........... H01G 9/028; H01G 9/15; H01G 9/022
(Continued)

(56) References Cited

U.S. PATENT DOCUMENTS

2004/0027789 A1* 2/2004 Kochi ................... H01G 9/15
361/523
2005/0212094 A1 9/2005 Takagi et al.

FOREIGN PATENT DOCUMENTS

JP    H1036667 A  *  2/1998
JP    3649526 B2  *  5/2005  ............ H01G 11/48
(Continued)

OTHER PUBLICATIONS

English Translation of Chinese Office Action dated Jan. 16, 2025 for the related Chinese Patent Application No. 202180070976.4.
(Continued)

Primary Examiner — Arun Ramaswamy
(74) Attorney, Agent, or Firm — Rimon P.C.

(57) ABSTRACT

An anode body, a dielectric layer disposed on a surface of the anode body, and a cathode part covering at least a part of the dielectric layer are provided. The cathode part includes a solid electrolyte layer covering the at least the part of the dielectric layer and containing a conjugated polymer. A solid electrolytic capacitor having excellent heat resistance is provided by using a solid electrolytic capacitor element where a full width at half maximum of a first peak is in a range from 35 cm$^{-1}$ to 80 cm$^{-1}$ inclusive when the first peak attributed to a CC stretching vibration derived from the conjugated polymer is fitted with a Lorentz function in a Raman spectrum of the solid electrolyte layer.

12 Claims, 1 Drawing Sheet

(58) Field of Classification Search
USPC ................................ 361/523, 527, 528, 532
See application file for complete search history.

(56) References Cited

FOREIGN PATENT DOCUMENTS

| | | |
|---|---|---|
| JP | 2005-281410 | 10/2005 |
| WO | 2019/187822 A1 | 10/2019 |

OTHER PUBLICATIONS

International Search Report of PCT application No. PCT/JP2021/038852 dated Jan. 11, 2022.

* cited by examiner

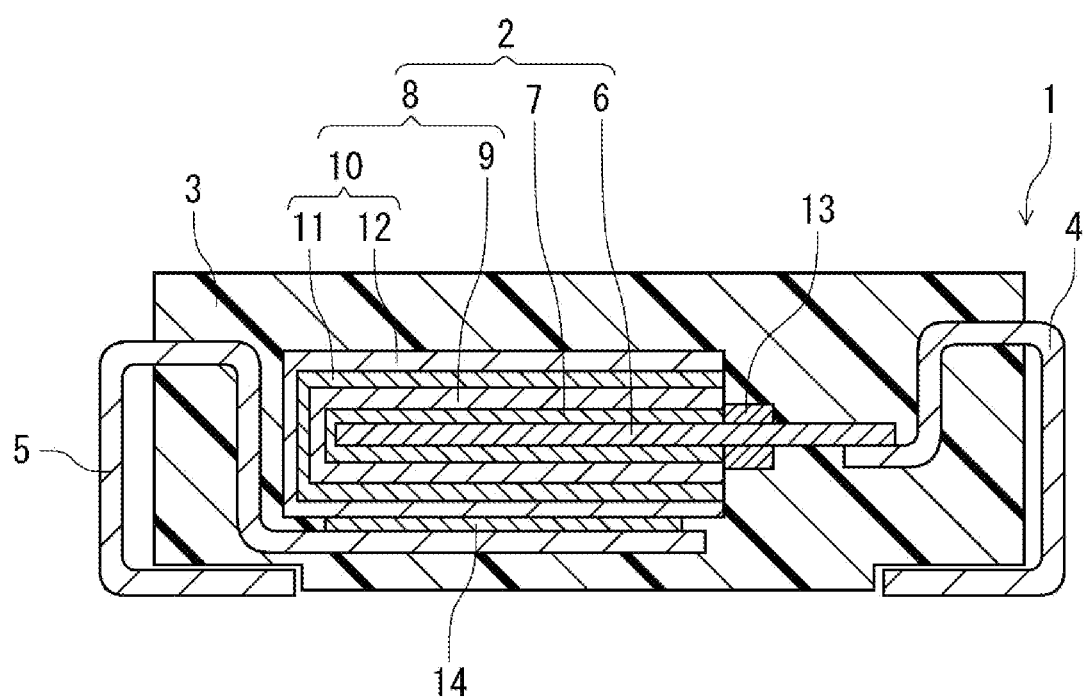

SOLID ELECTROLYTIC CAPACITOR ELEMENT AND SOLID ELECTROLYTIC CAPACITOR

TECHNICAL FIELD

The present disclosure relates to a solid electrolytic capacitor element and a solid electrolytic capacitor.

BACKGROUND

A solid electrolytic capacitor includes a solid electrolytic capacitor element, a resin exterior body or case that seals the solid electrolytic capacitor element, and an external electrode electrically connected with the solid electrolytic capacitor element. A solid electrolytic capacitor element includes an anode body, a dielectric layer disposed on a surface of the anode body, and a cathode part that covers at least a part of the dielectric layer. The cathode part includes a solid electrolyte layer that covers the at least the part of the dielectric layer and contains a conductive polymer component.

Unexamined Japanese Patent Publication No. 2005-281410 proposes a conductive polymer complexed with ionic polymer, in a solid electrolytic capacitor including at least an anode made of a valve metal, a dielectric film formed on the valve metal, and a solid electrolyte layer made of a conductive polymer formed on the dielectric film. Unexamined Japanese Patent Publication No. 2005-281410 describes that a conductive polymer is formed by chemical polymerization or electrolytic polymerization.

SUMMARY

A solid electrolytic capacitor element according to a first aspect of the present disclosure includes: an anode body; a dielectric layer disposed on a surface of the anode body; and a cathode part covering at least a part of the dielectric layer. The cathode part includes a solid electrolyte layer covering the at least the part of the dielectric layer and containing a conjugated polymer. A Raman spectrum of the solid electrolyte layer has a first peak attributed to a C=C stretching vibration derived from the conjugated polymer, full width at half maximum of a distribution profile of the first peak is in a range from 35 $cm^{-1}$ to 80 $cm^{-1}$, inclusive. The distribution profile of the first peak is obtained by fitting with a Lorentzian function.

A solid electrolytic capacitor element according to a second aspect of the present disclosure includes: an anode body; a dielectric layer disposed on a surface of the anode body; and a cathode part covering at least a part of the dielectric layer. The cathode part includes a solid electrolyte layer covering the at least the part of the dielectric layer and containing a conjugated polymer. A Raman spectrum of the solid electrolyte layer has a first peak attributed to a C=C stretching vibration derived from the conjugated polymers. A position of a distribution profile of the first peak is shifted from a reference position to a lower wavenumber side. The distribution profile of the first peak is obtained by fitting with a Lorentzian function. A shift amount of the position of the first peak from the reference position is 0.2% or more and 1% or less with respect to a wavenumber of the reference position. The reference position is a position of a distribution profile of a second peak attributed to a C=C stretching vibration derived from the conjugated polymer formed by bipolar electrolytic polymerization in a Raman spectrum of a solid electrolyte layer containing the conjugated polymer. The distribution profile of the second peak being obtained by fitting with a Lorentzian function.

A solid electrolytic capacitor according to a third aspect of the present disclosure includes at least one solid electrolytic capacitor element described above.

According to the present disclosure, it is possible to provide a solid electrolytic capacitor element and a solid electrolytic capacitor having excellent heat resistance.

BRIEF DESCRIPTION OF THE DRAWINGS

FIG. 1 is a schematic sectional view illustrating a solid electrolytic capacitor according to one exemplary embodiment of the present disclosure.

DESCRIPTION OF EMBODIMENT

Prior to the description of an exemplary embodiment, problems in the prior art are briefly described below.

When air enters an inside of a solid electrolytic capacitor, a conductive polymer component (conjugated polymer, dopant, etc.) is deteriorated by an action of moisture or oxygen contained in the air, and thus, conductivity of a solid electrolyte layer may be deteriorated. Further, when the orientation of the conjugated polymer in the solid electrolyte layer is low, a crack may occur in the solid electrolyte layer and air may be more likely to enter when the solid electrolytic capacitor is exposed to a high temperature, and thus, the conductive polymer component is likely to deteriorate. Deterioration of the conductive polymer component is remarkable particularly in a high-temperature environment. A solid electrolytic capacitor may be used in a high-temperature environment depending on use applications. Further, the solid electrolytic capacitor is generally bonded using solder to a substrate through a reflow step. In the reflow step, the solid electrolytic capacitor is exposed to a high temperature. Thus, there is a demand for the solid electrolytic capacitor element and the solid electrolytic capacitor that suppress the deterioration of the conductive polymer component under the high-temperature environment and have excellent heat resistance.

In view of the above, in the solid electrolytic capacitor element according to the first aspect of the present disclosure, the Raman spectrum of the solid electrolyte layer has a peak (first peak) attributed to the C=C stretching vibration derived from the conjugated polymer, and the full width at half maximum of a distribution profile of the first peak is controlled to be in a range from 35 $cm^{-1}$ to 80 $cm^{-1}$, inclusive, when the distribution profile of the first peak is obtained by fitting with a Lorentzian functions.

In the solid electrolytic capacitor element according to the second aspect of the present disclosure, in the Raman spectrum of the solid electrolyte layer, the position of a distribution profile of the first peak is controlled to be shifted from a reference position to a lower wavenumber side when the distribution profile of the first peak is obtained by fitting with a Lorentzian function, and a shift amount of the position of the first peak from the reference position is 0.2% or more and 1% or less with respect to a wavenumber of the reference position. Here, the reference position is a position of a distribution profile of a peak (second peak) attributed to the C=C stretching vibration derived from the conjugated polymer formed by bipolar electrolytic polymerization, and the distribution profile of the second peak is obtained by fitting with a Lorentzian function.

According to the first aspect, high orientation of the conjugated polymer in the solid electrolyte layer can be ensured, and a dense and rigid solid electrolyte layer having excellent film quality can be obtained. Thus, it is possible to ensure high conductivity of the solid electrolyte layer. In addition, when the solid electrolytic capacitor element is exposed to a high temperature, occurrence of cracks in the solid electrolyte layer can also be reduced and deterioration of the solid electrolyte layer is suppressed, whereby high conductivity is maintained and deterioration of the capacitor performance is suppressed. According to the second aspect, the conjugated polymer is in an energetically stabilized state in the solid electrolyte layer. Thus, it is possible to ensure high conductivity of the solid electrolyte layer. Even when the solid electrolytic capacitor element is exposed to a high temperature, oxidation reaction hardly proceeds, high conductivity is maintained, and deterioration of capacitor performance is suppressed. Hence, according to each of the first aspect and the second aspect, a solid electrolytic capacitor element and a solid electrolytic capacitor excellent in heat resistance are obtained. By obtaining excellent heat resistance, the reliability of the solid electrolytic capacitor element and the solid electrolytic capacitor can be enhanced.

In the solid electrolytic capacitor elements according to the first aspect and the second aspect, the solid electrolyte layer can be formed by tripolar electrolytic polymerization. Conventional general electrolytic polymerization is carried out in a bipolar manner using two electrodes of an anode and a counter electrode, wherein an anode body, which has a dielectric layer formed on the surface of the anode body, is used as the anode. In contrast, a tripolar electrolytic polymerization is carried out using three electrodes including an anode, a counter electrode, and a reference electrode wherein an anode body, which has a dielectric layer formed on the surface of the anode body, is used as the anode. During the tripolar electrolytic polymerization, by using the reference electrode, the potential of the anode can be precisely controlled without being affected by a change in the natural potential of the counter electrode. Thus, in the tripolar case, since the electrolytic polymerization reaction is controlled more precisely than in the bipolar case, the orientation of the conjugated polymer formed by electrolytic polymerization is enhanced, the crystallinity is improved, and the conjugated polymer is energetically stabilized. Hence, according to the first aspect, the full width at half maximum of the first peak is in a range from 35 $cm^{-1}$ to 80 $cm^{-1}$, inclusive (condition a). Further, according to the second aspect, the position of the first peak is shifted to the lower wavenumber side from the position of the second peak (that is, the reference position) for the solid electrolyte layer formed by the bipolar electrolytic polymerization (condition b), and the shift amount is 0.2% or more and 1% or less with respect to wavenumber of the reference position. In both the bipolar case and the tripolar case, the solid electrolyte layer can be formed by electrolytic polymerization of the precursor of the conjugated polymer on the surface of the dielectric layer in the presence of a dopant as necessary. According to the second aspect, since the conjugated polymer is easily appropriately doped with the dopant, the conjugated polymer is less likely to be in a reduced state, and thus the progress of the oxidation reaction is prevented and high heat resistance is obtained.

The main component of the solid electrolyte layer is the conjugated polymer, and in the Raman spectrum of the solid electrolyte layer, the peak attributed to the C=C stretching vibration derived from the conjugated polymer is the highest, and the height is characteristic. In the solid electrolyte layer, when the orientation of the conjugated polymer increases or the energy state changes, the vibration state of the C=C bond changes, and thus, at least one of the full width at half maximum of the peak attributed to the C=C stretching vibration and the position of the peak changes. Thus, the orientation state or the energy state of the conjugated polymer in the solid electrolyte layer can be grasped on the basis of at least one of the full width at half maximum and the peak position of the first peak attributed to the C=C stretching vibration.

In the present description, the Raman spectrum of the solid electrolyte layer is measured under the following conditions with respect to a cross section of the solid electrolyte layer at a predetermined position of the solid electrolytic capacitor element.

Raman spectrometer: RamanFORCE PAV manufactured by NanoPhoton Corporation

Diffraction grating: 600 gr/cm

Measurement wavenumber range: 0 cm' or more and 2500 cm' or less

Temperature: 25° C.

The irradiation laser light wavelength, the laser power density, and the exposure time are determined depending on the type of the conjugated polymer. For example, when the conjugated polymer is polypyrrol, the irradiation laser light wavelength is 532 nm, the laser power density is 140 $W/cm^2$, and the exposure time is 75 seconds. When the conjugated polymer is poly (3,4-ethylenedioxythiophene) (PEDOT), the irradiation laser light wavelength is 785 nm, the laser power density is 660 $W/cm^2$, and the exposure time is 60 seconds.

For the measurement of the Raman spectrum, a sample collected by the following procedure can be used. First, the solid electrolytic capacitor is embedded in a curable resin to cure the curable resin. By applying polishing treatment or cross section polishing working to the cured product, a cross section of the cured product parallel to the thickness direction of the solid electrolyte layer and perpendicular to the length direction of the capacitor element is exposed. When the length of the solid electrolyte layer in a direction parallel to the length direction of the capacitor element is 1, the cross section is at a position of 0 to 0.05 from the end part of the solid electrolyte layer at the side opposite to the anode lead-out part. In this way, a sample for measurement (sample A) is obtained. In the cross section of the exposed solid electrolyte layer of sample A, the Raman spectrum is measured for a region of 8 μm×8 μm of a portion (surface layer portion) from the surface to the depth 100 nm of the solid electrolyte layer and a portion formed in the holes and recesses (sometimes referred to as pits) of the surface of the anode body of the solid electrolyte layer. The full width at half maximum and the peak position of the peak attributed to the C=C stretching vibration are obtained by averaging the measured values for 6 regions of 8 μm×8 μm of the surface layer portion and 12 regions of 8 μm×8 μm of the portion formed in the pit of the solid electrolyte layer.

The anode body usually has an anode lead-out part including a first end part and a cathode formation part including a second end part. A direction directed from the first end part toward the second end part of the anode body is referred to as the length direction of the anode body or the capacitor element. The length of the solid electrolyte layer is the length in a direction parallel to the length direction of the capacitor element. The direction directed from the first end part toward the second end part of the anode body is parallel to a straight line direction that connects a center of an end surface of the first end part and a center of an end surface of the second end part to each other.

Hereinafter, the solid electrolytic capacitor and the solid electrolytic capacitor element (hereinafter, may be simply referred to as a capacitor element) of the present disclosure are described more specifically with reference to the drawings as necessary.

[Solid Electrolytic Capacitor]

A solid electrolytic capacitor includes one or more capacitor elements. At least one of the capacitor elements included in the solid electrolytic capacitor may include a solid electrolyte layer that satisfies at least one of condition a and condition b. It is preferable that 50% or more (more preferably 75% or more) of the capacitor elements included in the solid electrolytic capacitor include the solid electrolyte layer that satisfies at least one of condition a and condition b, and it is more preferable that all the capacitor elements include the solid electrolyte layer that satisfies at least one of condition a and condition b.

(Capacitor Element)
(Anode Body)

The anode body may include a valve action metal, an alloy containing the valve action metal, a compound containing the valve action metal, or the like. These materials can be used singly or in combination of two or more kinds thereof. As the valve action metal, for example, aluminum, tantalum, niobium, and titanium are preferably used. The anode body having a porous surface is obtained by, for example, roughening a surface of a base material (sheet-like (for example, a foil shape or a plate shape) base material, etc.) containing the valve action metal by etching or the like. The roughening can be performed by, for example, an etching treatment or the like. Furthermore, the anode body may be a molded body of particles that contain the valve action metal or a sintered body of the molded body. Note that each of the molded body and the sintered body has a porous structure. Each of the molded body and the sintered body may have a sheet shape, a rectangular parallelepiped shape, a cube shape, a shape similar thereto, or the like.

The anode body usually has an anode lead-out part and a cathode formation part. The cathode part is usually formed on the cathode formation part of the anode body with a dielectric layer interposed between the cathode part and the cathode formation part. An anode terminal is connected to the anode lead-out part.

(Dielectric Layer)

The dielectric layer is an insulating layer that functions as a dielectric material formed so as to cover a surface of at least a part of the anode body. The dielectric layer is formed by anodizing the valve action metal of the surface of the anode body by an anodizing treatment or the like. The dielectric layer may be formed in a manner of covering at least a part of the anode body. Usually, the dielectric layer is formed on the surface of the anode body. Since the dielectric layer is formed on the porous surface of the anode body, the surface of the dielectric layer has a fine uneven shape as described above.

The dielectric layer contains an oxide of a valve action metal. For example, when tantalum is used as the valve action metal, the dielectric layer contains $Ta_2O_5$, and when aluminum is used as the valve action metal, the dielectric layer contains $Al_2O_3$. Note that the dielectric layer is not limited thereto, and any dielectric layer may be used as long as the dielectric layer functions as a dielectric material.

(Cathode Part)

The cathode part includes a solid electrolyte layer covering at least a part of the dielectric layer. Furthermore, the cathode part may further include a cathode lead-out layer covering at least a part of the solid electrolyte layer. Usually, the cathode part is formed on at least a part of the surface of the anode body with the dielectric layer interposed between the cathode part and the surface of the anode body. Hereinafter, the solid electrolyte layer and the cathode lead-out layer are described.

(Solid Electrolyte Layer)

The solid electrolyte layer is formed on the surface of the anode body so as to cover the dielectric layer with the dielectric layer interposed therebetween. The solid electrolyte layer does not necessarily cover the entire dielectric layer (the entire surface of the dielectric layer), and the solid electrolyte layer may be formed in a manner of covering at least a part of the dielectric layer. The solid electrolyte layer constitutes at least a part of the cathode part of the solid electrolytic capacitor.

The solid electrolyte layer generally contains a conductive polymer component. The conductive polymer component contains at least a conjugated polymer and may further contain a dopant as necessary.

(Conjugated Polymer)

As the conjugated polymer, there can be used, for example, a known polymer used for an electrolytic capacitor, such as a π-conjugated polymer. Examples of the conjugated polymer include polymers having polypyrrole, polythiophene, polyaniline, polyfuran, polyacetylene, polyphenylene, polyphenylene vinylene, polyacene, and polythiophene vinylene as a basic skeleton. The polymer may include at least one kind of monomer unit constituting the basic skeleton. The above-mentioned polymers also include a homopolymer, a copolymer of two or more kinds of monomers, and derivatives of these polymers (a substitute having a substituent group, etc.).

Among the conjugated polymers, a conjugated polymer including a monomer unit corresponding to a pyrrole compound, a conjugated polymer including a monomer unit corresponding to a thiophene compound, and the like are preferable. Examples of the pyrrole compound include a compound having a pyrrole ring and capable of forming a repeat structure of a corresponding monomer unit. Examples of the thiophene compound include a compound having a thiophene ring and capable of forming a repeat structure of a corresponding monomer unit. These compounds can be linked at the 2-position and 5-position of the pyrrole ring or the thiophene ring to form the repeat structure of the monomer unit, thus can form a polymer with a π electron cloud spread throughout the molecule.

The pyrrole compound may have, for example, a substituent at at least one of the 3- and 4-positions of the pyrrole ring. The thiophene compound may have a substituent at at least one of the 3- and 4-positions of the thiophene ring, for example. The substituent at the 3-position and the substituent at the 4-position may be linked to form a ring fused to a pyrrole ring or a thiophene ring. Examples of the pyrrole compound include pyrrole which may have a substituent at at least one of the 3- and 4-positions. Examples of the thiophene compound include thiophene which may have a substituent at at least one of the 3- and 4-positions and an alkylene dioxythiophene compound ($C_{2-4}$ alkylenedioxythiophene compounds such as ethylenedioxythiophene compounds, and the like). The alkylene dioxythiophene compound also includes those having a substituent in a part of an alkylene group.

The substituent is preferably an alkyl group ($C_{1-4}$ alkyl groups such as methyl group and ethyl group, and the like), an alkoxy group ($C_{1-4}$ alkoxy groups such as methoxy group and ethoxy group, and the like), a hydroxy group, a hydroxyalkyl group (a hydroxy $C_{1-4}$ alkyl group such as a hydroxymethyl group, and the like), or the like, but is not limited thereto. When each of the pyrrole compound and the thiophene compound has two or more substituents, the respective substituents may be the same or different.

In particular, it is preferable to use a conjugated polymer including at least a monomer unit corresponding to pyrrole or a conjugated polymer (such as PEDOT) including at least a monomer unit corresponding to a 3,4-ethylenedioxythiophene compound (such as 3,4-ethylenedioxythiophene (EDOT)) because it is easy to obtain high heat resistance and it is easy to secure higher conductivity of the solid electrolyte layer. The conjugated polymer including at least a monomer unit corresponding to pyrrole may include only a monomer unit corresponding to pyrrole, or may include a monomer unit corresponding to a pyrrole compound other than pyrrole (pyrrole having a substituent, etc.) in addition to the monomer unit. The conjugated polymer including at least a monomer unit corresponding to EDOT may include only a monomer unit corresponding to EDOT, or may include a monomer unit corresponding to a thiophene compound other than EDOT in addition to the monomer unit.

In the conjugated polymer including a monomer unit corresponding to a pyrrole compound, the molar ratio of the monomer unit corresponding to the pyrrole compound (or pyrrole) is preferably 90 mol % or more from the viewpoint of easily ensuring higher electrostatic capacity. The molar ratio of the monomer unit corresponding to the pyrrole compound (or pyrrole) in the conjugated polymer is 100 mol % or less. The conjugated polymer may be composed of only a repeat structure of the monomer unit corresponding to the pyrrole compound (or pyrrole).

In the conjugated polymer including the monomer unit corresponding to the thiophene compound, the molar ratio of the monomer unit corresponding to the thiophene compound (or EDOT) is preferably 90 mol % or more from the viewpoint of easily ensuring higher electrostatic capacity. The molar ratio of the monomer unit corresponding to the thiophene compound (or EDOT) in the conjugated polymer is 100 mol % or less. The conjugated polymer may be composed of only a repeat structure of the monomer unit corresponding to the thiophene compound (or EDOT).

As the conjugated polymer, one kind may be used alone, or two or more kinds may be used in combination.

A weight-average molecular weight (Mw) of the conjugated polymer is not particularly limited, and is, for example, in a range from 1,000 to 1,000,000, inclusive.

Note that, in the present description, the weight-average molecular weight (Mw) is a value in terms of polystyrene measured by gel permeation chromatography (GPC). Note that usually, GPC is measured using a polystyrene gel column, and water and methanol (volume ratio 8:2) that form a mobile phase.

(Dopant)

As the dopant, at least one selected from the group consisting of anions and polyanions is used, for example.

Examples of the anion include, but are not particularly limited to, a sulfate ion, a nitrate ion, a phosphate ion, a borate ion, an organic sulfonate ion, and a carboxylate ion. Examples of the dopant that generates sulfonate ions include p-toluenesulfonic acid and naphthalenesulfonic acid.

Examples of the polyanion include a polymer anion. The solid electrolyte layer may contain, for example, a conjugated polymer including a monomer unit corresponding to a thiophene compound and a polymer anion. In the case where the solid electrolytic capacitor contains a polymer anion, even when the solid electrolytic capacitor element is exposed to a high temperature, dedoping hardly occurs, and thus higher heat resistance is obtained.

Examples of the polymer anion include polymers having a plurality of anionic groups. Examples of such a polymer include a polymer including a monomer unit having an anionic group. Examples of the anionic group include a sulfonic acid group and a carboxy group.

In the solid electrolyte layer, the anionic group of the dopant may be contained in a free form, an anion form, or a salt form, or may be contained in a form bonded or interacting with the conjugated polymer. In the present description, all of these forms may be simply referred to as an "anionic group", a "sulfonic acid group", or a "carboxy group", etc.

Examples of the polymer anion having a carboxy group include, but are not limited to, a copolymer using at least one of polyacrylic acid, polymethacrylic acid, acrylic acid, and methacrylic acid.

Specific examples of the polymer anion having a sulfonic acid group, for example, polymer type polysulfonic acids, include, but are not limited to, polyvinylsulfonic acid, polystyrenesulfonic acid (including copolymers and substituted products with substituents, etc.), polyallylsulfonic acid, polyacrylsulfonic acid, polymethacrylsulfonic acid, poly (2-acrylamide-2-methylpropanesulfonic acid), polyisoprenesulfonic acid, polyestersulfonic acid (aromatic polyester sulfonic acid, etc.), and phenolsulfonic acid novolac resin.

An amount of the dopant contained in the solid electrolyte layer is, for example, in a range from 10 parts by mass to 1000 parts by mass, inclusive, and may be in a range from 20 parts by mass to 500 parts by mass, inclusive, or in a range from 50 parts by mass to 200 parts by mass, inclusive, with respect to 100 parts by mass of the conjugated polymer.

(Raman Spectrum)

In the Raman spectrum of the solid electrolyte layer, the full width at half maximum of the first peak is, for example, 80 $cm^{-1}$ or less. As a result, high orientation of the conjugated polymer is obtained and a solid electrolyte layer having excellent film quality is obtained, and thus, high heat resistance of the solid electrolytic capacitor can be secured. The full width at half maximum of the first peak is 35 $cm^{-1}$ or more. In this case, the solid electrolyte layer can be easily formed. From the viewpoint of obtaining higher orientation and higher heat resistance, the full width at half maximum of the first peak may be 50 $cm^{-1}$ or more, 55 $cm^{-1}$ or more, or 58 $cm^{-1}$ or more.

In the Raman spectrum of the solid electrolyte layer, the position of the first peak is shifted to the lower wavenumber side from the reference position in the case where the solid electrolyte layer is formed by the bipolar electrolytic polymerization. The shift amount at this time is usually 0.2% or more, and preferably 0.25% or more or 0.3% or more with respect to a wavenumber of the reference position. When the shift amount is in such a range, the conjugated polymer is in an energetically stable state in the solid electrolyte layer, and thus the oxidation reaction is less likely to proceed. For example, since the conjugated polymer is more likely to be appropriately doped with the dopant, the conjugated polymer is less likely to be in a reduced state. Thus, high heat resistance is obtained. The shift amount is usually 1% or less, and may be 0.7% or less or 0.51% or less with respect to a wavenumber of the reference position. When the shift amount is in such a range, the conjugated polymer is more likely to be appropriately doped with the dopant, and thus, an excessive increase in the decomposition of the dopant contained in the solid electrolyte layer is suppressed. Hence, high heat resistance is obtained. The lower and upper limit values of the shift amount can be arbitrarily combined.

For example, when the conjugated polymer includes at least a monomer unit corresponding to pyrrole, the position of the first peak is preferably 1566 cm$^{-1}$ or more and 1578 cm$^{-1}$ or less, more preferably 1570 cm$^{-1}$ or more and 1577 cm$^{-1}$ or less. When the conjugated polymer includes at least a monomer unit corresponding to EDOT, the position of the first peak is preferably 1423 cm$^{-1}$ or more and 1435 cm$^{-1}$ or less, more preferably 1429 cm$^{-1}$ or more and 1434 cm$^{-1}$ or less. In these cases, higher heat resistance of the solid electrolytic capacitor element can be ensured.

(Others)

The solid electrolyte layer may further contain at least one selected from a group consisting of a known additive agent and a known conductive material other than the conductive polymer component as necessary. Examples of conductive material include at least one selected from the group consisting of conductive inorganic materials such as manganese dioxide and TCNQ complex salts.

The solid electrolyte layer may be a single layer or may be formed of a plurality of layers. For example, the solid electrolyte layer may include a first solid electrolyte layer covering at least a part of the dielectric layer and a second solid electrolyte layer covering at least a part of the first solid electrolyte layer. The type, composition, content, and the like of the conductive polymer component, the additive agent, and the like contained in each layer may be different or the same in each layer.

Note that a layer for improving adhesiveness (for example, a precoat layer formed of a conductive material) or the like may be interposed between the dielectric layer and the solid electrolyte layer.

(Method of Forming Solid Electrolyte Layer)

The solid electrolyte layer can be formed by electrolytically polymerizing a precursor of the conjugated polymer in a tripolar manner in the presence of the dopant as necessary on the surface of the dielectric layer. For example, electrolytic polymerization is performed in a state where a cathode formation part of an anode body having a dielectric layer formed on a surface thereof is immersed in a liquid mixture containing the precursor of the conjugated polymer and the dopant as necessary. By performing such electrolytic polymerization, the orientation of the conjugated polymer can be enhanced. Further, the conjugated polymer can be energetically stabilized by being appropriately doped with a dopant. Hence, high heat resistance of the capacitor element can be ensured.

Examples of the precursor of the conjugated polymer include a raw material monomer of the conjugated polymer, an oligomer and a prepolymer in which a plurality of molecular chains of the raw material monomer are linked, and the like. One kind of precursor may be used, or two or more kinds of precursor may be used in combination. From the viewpoint of easily obtaining higher orientation of the conjugated polymer, it is preferable to use at least one kind selected from a group consisting of monomers and oligomers (particularly, monomers) as the precursor.

The liquid mixture usually contains a solvent. Examples of the solvent include water, an organic solvent, and a mixed solvent of water and an organic solvent (such as a water-soluble organic solvent).

When a dopant, another conductive material, an additive agent, and the like are used, they may be added to the liquid mixture.

The liquid component may contain an oxidizing agent as necessary. Furthermore, the oxidizing agent may be applied to the anode body before or after the liquid mixture is brought into contact with the anode body on which the dielectric layer is formed. Examples of such an oxidizing agent include a sulfate, a sulfonic acid, and a salt thereof. One kind of oxidizing agent can be used singly, or two or more kinds of oxidizing agents can be used in combination. Examples of the sulfate include a salt of a metal and a sulfuric acid group including sulfuric acid, persulfuric acid, etc., such as ferric sulfate and sodium persulfate. Examples of the metal constituting the salt include alkali metals (sodium, potassium, and the like), iron, copper, chromium, and zinc. The sulfonic acid or a salt of the sulfonic acid has a function as a dopant in addition to a function as the oxidizing agent. As the sulfonic acid or a salt of the sulfonic acid, a low molecular sulfonic acid or a salt thereof, etc. exemplified for other dopants may be used.

The pH of the liquid mixture is, for example, 0.5 or more and 2.5 or less, preferably 0.5 or more and 2 or less, or 1 or more and 2 or less. When the pH of the liquid mixture is in such a range, generation of oxygen during electrolytic polymerization can be suppressed, and a solid electrolyte layer having excellent film quality can be easily obtained. The pH of the liquid mixture can be adjusted by, for example, adjusting the content of the dopant, the content of the oxidizing agent, or the like in the liquid mixture.

Tripolar electrolytic polymerization is performed in a state in which the anode body, the counter electrode, and the reference electrode are immersed in the liquid mixture. As the counter electrode, for example, a Ti electrode is used, but the counter electrode is not limited thereto. As the reference electrode, it is preferable to use a silver/silver chloride electrode (Ag/Ag$^+$).

In the electrolytic polymerization, a voltage (polymerization voltage) applied to the anode body is, for example, in a range from 0.6 V to 1.5 V, inclusive, and may be in a range from 0.7 V to 1 V, inclusive or in a range from 0.7 V to 0.9 V, inclusive. By performing the tripolar electrolytic polymerization, the electrolytic polymerization can be performed at such a relatively low polymerization voltage, and the polymerization reaction can be precisely controlled. Hence, the orientation of the conjugated polymer can be further enhanced. Further, a dopant can be appropriately doped. Note that the polymerization voltage is a potential of the anode body with respect to a reference electrode (silver/silver chloride electrode (Ag/Ag$^+$)). During the electrolytic polymerization, a power feeder (such as a power feeding tape) is electrically connected to the anode lead-out part, and a voltage is applied to the anode body via the power feeder. The potential of the anode body is a potential of the power feeder electrically connected to the anode body.

The temperature at which the electrolytic polymerization is performed is, for example, in a range from 5° C. to 60° C., inclusive, and may be in a range from 15° C. to 35° C., inclusive.

(Cathode Lead-Out Layer)

The cathode lead-out layer only has to include at least a first layer that is in contact with the solid electrolyte layer and covers at least part of the solid electrolyte layer, and may include a first layer and a second layer covering the first layer. Examples of the first layer include: a layer containing conductive particles; and a metal foil. Examples of the conductive particles include at least one selected from conductive carbon and metal powder. For example, the cathode lead-out layer may be formed of a layer containing conductive carbon (also referred to as a carbon layer) as the first layer and a layer containing metal powder or a metal foil as the second layer. When a metal foil is used as the first layer, the metal foil may constitute the cathode lead-out layer.

Examples of the conductive carbon include graphite (artificial graphite, natural graphite, etc.).

The layer containing metal powder as the second layer can be formed, for example, by laminating a composition containing metal powder on a surface of the first layer. Examples of such a second layer include a metal paste layer formed using a composition containing metal powder such as silver particles and a resin (binder resin). As the resin, although a thermoplastic resin can be used, it is preferable to use a thermosetting resin such as an imide resin or an epoxy resin.

When a metal foil is used as the first layer, the type of metal is not particularly limited, but it is preferable to use a valve action metal such as aluminum, tantalum, or niobium, or an alloy containing the valve action metal. As necessary, the surface of the metal foil may be roughened. On the surface of the metal foil, there may be provided an anodization film, and there may be provided a film of a metal (different type of metal) different from the metal constituting the metal foil, or a non-metal film. Examples of the different type of metal and the non-metal include metal such as titanium and non-metal such as carbon (conductive carbon and the like).

A film of the different type of metal or nonmetal (for example, conductive carbon) may be used as the first layer, and the metal foil may be used as the second layer.

(Separator)

When the metal foil is used for the cathode lead-out layer, a separator may be disposed between the metal foil and the anode foil. The separator is not particularly limited, for example, it is possible to use an unwoven fabric including fibers of cellulose, polyethylene terephthalate, vinylon, or polyamide (for example, aliphatic polyamide or aromatic polyamide such as aramid).

(Others)

The solid electrolytic capacitor may be a wound type, or may be either a chip type or a stacked type. For example, the solid electrolytic capacitor may include a stack body of two or more capacitor elements. The configuration of the capacitor element may be selected in accordance with the type of the solid electrolytic capacitor.

In the capacitor element, one end part of the cathode terminal is electrically connected to the cathode lead-out layer. For example, a conductive adhesive is applied to the cathode lead-out layer, and the cathode terminal is bonded to the cathode lead-out layer via the conductive adhesive. One end part of an anode terminal is electrically connected to the anode body. The other end part of the anode terminal and the other end part of the cathode terminal are respectively drawn out from a resin exterior body or a case. The other end part of each terminal exposed from the resin exterior body or the case is used for, for example, solder connection to a substrate on which the solid electrolytic capacitor is to be mounted.

The capacitor element is sealed using the resin exterior body or the case. For example, a material resin (for example, uncured thermosetting resins and fillers) of the capacitor element and the exterior body may be housed in a mold, and the capacitor element may be sealed with the resin exterior body by a transfer molding method, a compression molding method, or the like. At this time, a part on the other end part side of each of the anode terminal and the cathode terminal connected to the anode lead drawn out from the capacitor element is exposed from the mold. Further, the solid electrolytic capacitor may be formed by housing the capacitor element in a bottomed case such that a part on the other end part side of each of the anode terminal and the cathode terminal is positioned on an opening side of the bottomed case, and sealing the opening of the bottomed case with a sealing body.

FIG. 1 is a cross-sectional view schematically illustrating a structure of a solid electrolytic capacitor according to one exemplary embodiment of the present disclosure. As illustrated in FIG. 1, solid electrolytic capacitor 1 includes capacitor element 2, resin exterior body 3 that seals capacitor element 2, and anode terminal 4 and cathode terminal 5 that are each at least partially exposed to an outside of resin exterior body 3. Anode terminal 4 and cathode terminal 5 can be made of metal such as copper or a copper alloy. Resin exterior body 3 has a substantially rectangular parallelepiped outer shape, and solid electrolytic capacitor 1 also has a substantially rectangular parallelepiped outer shape.

Capacitor element 2 includes anode body 6, dielectric layer 7 covering anode body 6, and cathode part 8 covering dielectric layer 7. Cathode part 8 includes solid electrolyte layer 9 covering dielectric layer 7, and cathode lead-out layer 10 covering solid electrolyte layer 9. In the illustrated example, solid electrolyte layer 9 contains a conjugated polymer.

Anode body 6 includes a region facing cathode part 8 and a region not facing cathode part 8. In the region of anode body 6 that does not face cathode part 8, insulating separation part 13 is formed in a part adjacent to cathode part 8 to cover a surface of anode body 6 in a band shape, so that contact between cathode part 8 and anode body 6 is restricted. Another part of the region of anode body 6 not facing cathode part 8 is electrically connected to anode terminal 4 by welding. Cathode terminal 5 is electrically connected to cathode part 8 via adhesive layer 14 formed of a conductive adhesive.

EXAMPLES

Hereinafter, the present invention is specifically described with reference to examples and comparative examples, but the present invention is not limited to the following examples.

<<Solid Electrolytic Capacitors A1 to A4>>

Solid electrolytic capacitor 1 (solid electrolytic capacitors A1 to A4) illustrated in FIG. 1 is produced in the following manner, and the characteristics of solid electrolytic capacitor 1 are evaluated.

(1) Preparation of Anode Body 6

Both surfaces of an aluminum foil (thickness: 100 μm) as a base material are roughened by etching to prepare anode body 6.

(2) Formation of Dielectric Layer 7

A cathode formation part of anode body 6 is immersed in an anodizing solution, and a DC voltage of 70 V is applied for 20 minutes to form dielectric layer 7 containing aluminum oxide.

(3) Formation of Solid Electrolyte Layer 9

Separation part 13 is formed by attaching an insulating resist tape between the region where the solid electrolyte layer is formed and the region where the solid electrolyte layer is not formed of anode body 6 on which dielectric layer 7 is formed. Anode body 6 on which separation part 13 is formed is immersed in a liquid composition containing a conductive material, taken out, and dried to form a precoat layer (not shown).

A polymerization liquid containing pyrrole (monomer of a conjugated polymer), naphthalenesulfonic acid (dopant), and water is prepared. By adjusting the addition amount of naphthalenesulfonic acid, the pH of the polymerization liquid is adjusted as shown in Table 1. Using the obtained polymerization liquid, electrolytic polymerization is performed in a tripolar manner. More specifically, anode body 6 on which the precoat layer is formed, the counter electrode, and the reference electrode (silver/silver chloride reference electrode) are immersed in the polymerization liquid. A voltage is applied to anode body 6 in a manner that the potential of anode body 6 with respect to the reference electrode is the value of the polymerization voltage shown in Table 1 and electrolytic polymerization is performed at 25° C. to form solid electrolyte layer 9.

(4) Formation of Cathode Lead-Out Layer 10

Anode body 6 obtained in the above step (3) is immersed in a dispersion liquid in which graphite particles are dispersed in water, taken out from the dispersion liquid, and then dried to form carbon layer 11 at least on a surface of solid electrolyte layer 9. Drying is carried out at a temperature ranging from 130° C. to 180° C. for 10 minutes to 30 minutes.

Next, a silver paste containing silver particles and a binder resin (epoxy resin) is applied onto the surface of carbon layer 11, and heated at 150° C. to 200° C. for 10 minutes to 60 minutes to cure the binder resin, thereby forming metal paste layer 12. Cathode lead-out layer 10 composed of carbon layer 11 and metal paste layer 12 is thus formed, and cathode part 8 composed of solid electrolyte layer 9 and cathode lead-out layer 10 is formed.

Capacitor element 2 is produced as described above.

(5) Assembly of Solid Electrolytic Capacitor

Cathode part 8 of capacitor element 2 obtained in the above step (4) is bonded to one end part of cathode terminal 5 with adhesive layer 14 of a conductive adhesive. One end part of anode body 6 protruding from capacitor element 2 and one end part of anode terminal 4 are bonded to each other by laser welding.

Subsequently, resin exterior body 3 formed of an insulating resin is formed around capacitor element 2 by molding. At this time, the other end part of anode terminal 4 and the other end part of cathode terminal 5 are drawn out from resin exterior body 3.

In this way, solid electrolytic capacitor 1 (A1 to A5) is completed. In the same manner as described above, twenty solid electrolytic capacitors are produced in total.

<<Solid Electrolytic Capacitor A5>>

A mixed solution is prepared by dissolving a 3,4-ethylenedioxythiophene monomer and polystyrene sulfonic acid (PSS, Mw: $160\times10^3$) as a polymer anion in ion-exchanged water. While the mixed solution is being stirred, iron (III) sulfate (oxidizing agent) dissolved in ion-exchanged water is added to the mixed solution to prepare a polymerization liquid. Twenty solid electrolytic capacitors A5 are produced in the same manner as in the cases of solid electrolytic capacitors A1 to A4 except that the obtained polymerization liquid is used.

<<Solid Electrolytic Capacitor B1>>

Twenty solid electrolytic capacitors B1 are formed in the same manner as in the cases of solid electrolytic capacitors A1 to A4 except that the electrolytic polymerization is performed in a bipolar manner. During the electrolytic polymerization, the anode body on which the precoat layer is formed and a Ti electrode as the counter electrode are immersed in the polymerization liquid, and electrolytic polymerization is performed by applying a voltage to the anode body in a manner that the potential of the anode body with respect to the silver/silver chloride reference electrode is the value of the polymerization voltage shown in Table 1, thereby forming a solid electrolyte layer.

<<Solid Electrolytic Capacitor B2>>

Twenty solid electrolytic capacitors B2 are formed in the same manner as in the case of solid electrolytic capacitor A5 except that the electrolytic polymerization is performed in a bipolar manner. During the electrolytic polymerization, the anode body on which the precoat layer is formed and a Ti electrode as the counter electrode are immersed in the polymerization liquid, and electrolytic polymerization is performed by applying a voltage to the anode body in a manner that the potential of the anode body with respect to the silver/silver chloride reference electrode is the value of the polymerization voltage shown in Table 1, thereby forming a solid electrolyte layer.

[Evaluation]

The following evaluations have been performed using a solid electrolytic capacitor.

(a) Raman Spectrum Measurement of Solid Electrolyte Layer

The Raman spectrum of the cross section of the solid electrolyte layer of the capacitor element taken out from the solid electrolytic capacitor is measured in accordance with the procedure described above. In the Raman spectrum of the solid electrolyte layer of the solid electrolytic capacitor B1, a peak (second peak) attributed to a C=C stretching vibration derived from polypyrrole is observed at 1582 $cm^{-1}$. In the Raman spectrum of the solid electrolyte layer of the solid electrolytic capacitor B2, a peak (second peak) attributed to a C=C stretching vibration derived from PEDOT is observed at 1438 $cm^{-1}$. In the Raman spectrum of the solid electrolyte layer of the capacitor element taken out from each solid electrolytic capacitor, the half width at full maximum of the first peak derived from polypyrrole or PEDOT is obtained, and the shift amount from the position (reference position) of the second peak is obtained. The shift amount is evaluated as a ratio (%) of an actual shift amount ($cm^{-1}$) of the first peak from the reference position when the wavenumber at the reference position is set to 100%.

(b) Electrostatic Capacity

The initial electrostatic capacity (g) of each solid electrolytic capacitor at a frequency of 120 Hz is measured using an LCR meter for 4-terminal measurement under an environment of 20° C. Then, an average value of the twenty solid electrolytic capacitors is obtained.

Then, an accelerated test is performed by applying a rated voltage to the solid electrolytic capacitor for 2000 hours under an environment of 145° C. Thereafter, the electrostatic capacity after the accelerated test is measured in an environment at 20° C. using the same procedure as in the case of the initial electrostatic capacity and an average value of the twenty solid electrolytic capacitors is obtained. A value obtained by subtracting the initial electrostatic capacity from the electrostatic capacity after the accelerated test is defined as an electrostatic capacity change rate, and is expressed as a ratio when the initial electrostatic capacity is set to 100%. The electrostatic capacity change rate is a negative value, and a smaller electrostatic capacity change rate indicates lower heat resistance.

The results of the evaluation are shown in Table 1. B1 and B2 are comparative examples.

TABLE 1

|    | Conjugated polymer | Polymerization voltage (V) | pH | Full width at half maximum | Shift amount (%) | Electrostatic capacity change rate (%) |
|----|---------------------|----------------------------|----|-----------------------------|------------------|----------------------------------------|
| A1 | Polypyrrol          | 0.8                        | 1  | 70.8                        | 0.61             | −0.10                                  |
| A2 | Polypyrrol          | 0.7                        | 2  | 58.0                        | 0.30             | −8.90                                  |
| A3 | Polypyrrol          | 0.8                        | 2  | 79.7                        | 0.35             | −5.70                                  |
| A4 | Polypyrrol          | 0.9                        | 1  | 74.1                        | 0.30             | −13.40                                 |
| B1 | Polypyrrol          | 3.0                        | 3  | 81.6                        | 0.00             | −30.30                                 |
| A5 | PEDOT               | 0.9                        | 2  | 78.1                        | 0.35             | −17.20                                 |
| B2 | PEDOT               | 2.8                        | 3  | 82.0                        | 0.00             | −36.40                                 |

The present disclosure provides a solid electrolytic capacitor element and a solid electrolytic capacitor excellent in heat resistance. Therefore, the solid electrolytic capacitor element and the solid electrolytic capacitor can be used for various applications in which high reliability is required.

The invention claimed is:

1. A solid electrolytic capacitor element comprising:
an anode body;
a dielectric layer disposed on a surface of the anode body; and
a cathode part covering at least a part of the dielectric layer, wherein:
the cathode part includes a solid electrolyte layer, the solid electrolyte layer covering the at least the part of the dielectric layer and containing a conjugated polymer,
a Raman spectrum of the solid electrolyte layer has a first peak attributed to a C=C stretching vibration derived from the conjugated polymer, and
a full width at half maximum of a distribution profile of the first peak is in a range from 35 $cm^{-1}$ to 80 $cm^{-1}$, inclusive, the distribution profile of the first peak being obtained by fitting with a Lorentzian function.

2. The solid electrolytic capacitor element according to claim 1, wherein
a position of the first peak is shifted from a reference position to a lower wavenumber side,
a shift amount of the position of the first peak from the reference position is 0.2% or more and 1% or less with respect to a wavenumber of the reference position, and
the reference position is a position of a distribution profile of a second peak attributed to a C=C stretching vibration derived from the conjugated polymer formed by bipolar electrolytic polymerization in a Raman spectrum of a solid electrolyte layer containing the conjugated polymer the distribution profile of the second peak being obtained by fitting with a Lorentzian functions.

3. The solid electrolytic capacitor element according to claim 2, wherein:
the conjugated polymer includes at least a monomer unit corresponding to pyrrole, and
the reference position is 1582 $cm^{-1}$.

4. The solid electrolytic capacitor element according to claim 2, wherein:
the conjugated polymer includes at least a monomer unit corresponding to 3,4-ethylenedioxythiophene, and
the reference position is 1438 $cm^{-1}$.

5. The solid electrolytic capacitor element according to claim 1, wherein:
the conjugated polymer includes at least a monomer unit corresponding to pyrrole, and
a position of the first peak is in a range from 1566 $cm^{-1}$ to 1578 $cm^{-1}$, inclusive.

6. The solid electrolytic capacitor element according to claim 1, wherein
the conjugated polymer includes at least a monomer unit corresponding to 3,4-ethylenedioxythiophene, and
a position of the first peak is in a range from 1423 $cm^{-1}$ to 1435 $cm^{-1}$, inclusive.

7. The solid electrolytic capacitor element according to claim 4, wherein
the solid electrolyte layer further contains a polymer anion.

8. A solid electrolytic capacitor comprising at least one solid electrolytic capacitor element according to claim 1.

9. The solid electrolytic capacitor element according to claim 6, wherein
the solid electrolyte layer further contains a polymer anion.

10. A solid electrolytic capacitor element comprising:
an anode body;
a dielectric layer disposed on a surface of the anode body; and
a cathode part covering at least a part of the dielectric layer, wherein:
the cathode part includes a solid electrolyte layer, the solid electrolyte layer covering the at least the part of the dielectric layer and containing a conjugated polymer,
a Raman spectrum of the solid electrolyte layer, has a first peak attributed to a C=C stretching vibration derived from the conjugated polymer,
a position of a distribution profile of the first peak is shifted from a reference position to a lower wavenumber side, the distribution profile of the first peak being obtained by fitting with a Lorentzian function,
a shift amount of the position of the first peak from the reference position is 0.2% or more and 1% or less with respect to a wavenumber of the reference position, and
the reference position is a position of a distribution profile of a second peak attributed to a C=C stretching vibration derived from the conjugated polymer formed by bipolar electrolytic polymerization in a Raman spectrum of the solid electrolyte layer containing the conjugated polymer, the distribution profile of the second peak being obtained by fitting with Lorentzian function.

11. The solid electrolytic capacitor element according to claim 10, wherein:
the conjugated polymer includes at least a monomer unit corresponding to pyrrole, and
the reference position is 1582 $cm^{-1}$.

12. The solid electrolytic capacitor element according to claim 10, wherein:
the conjugated polymer includes at least a monomer unit corresponding to 3,4-ethylenedioxythiophene, and
the reference position is 1438 cm$^{-1}$.

* * * * *